(12) United States Patent
Cirillo et al.

(10) Patent No.: US 11,661,087 B2
(45) Date of Patent: May 30, 2023

(54) TARGET ARRANGEMENT, METHOD, AND CONTROL UNIT FOR FOLLOWING A TARGET VEHICLE

(71) Applicant: Scania CV AB, Södertälje (SE)

(72) Inventors: Marcello Cirillo, Hägersten (SE); Magnus Granström, Hägersten (SE); Mattias Nilsson, Södertälje (SE); Julien Bidot, Södertälje (SE); Jiwung Choi, Södertälje (SE); Rui Oliveira, Stockholm (SE)

(73) Assignee: Scania CV AB, Södertälje (SE)

( * ) Notice: Subject to any disclaimer, the term of this patent is extended or adjusted under 35 U.S.C. 154(b) by 219 days.

(21) Appl. No.: 16/492,803

(22) PCT Filed: Mar. 7, 2018

(86) PCT No.: PCT/SE2018/050216
§ 371 (c)(1),
(2) Date: Sep. 10, 2019

(87) PCT Pub. No.: WO2018/169469
PCT Pub. Date: Sep. 20, 2018

(65) Prior Publication Data
US 2021/0139051 A1 May 13, 2021

(30) Foreign Application Priority Data
Mar. 14, 2017 (SE) ..................... 1750288-1

(51) Int. Cl.
*B60W 60/00* (2020.01)
*H04W 4/46* (2018.01)
*G05D 1/02* (2020.01)

(52) U.S. Cl.
CPC ..... *B60W 60/00272* (2020.02); *G05D 1/0295* (2013.01); *H04W 4/46* (2018.02); *B60W 2520/10* (2013.01); *G05D 2201/0213* (2013.01)

(58) Field of Classification Search
CPC ....... B60W 60/00272; B60W 2520/10; H04W 4/46; G05D 1/0295; G05D 2201/0213
See application file for complete search history.

(56) References Cited

U.S. PATENT DOCUMENTS 9,387,857 B2   7/2016 Fairgrieve et al.
9,526,199 B2  12/2016 Matsuzaki et al.
(Continued)

FOREIGN PATENT DOCUMENTS

CN    104349926 A    2/2015
CN    105022399 A   11/2015
(Continued)

OTHER PUBLICATIONS dated Korean Application No. 10-2019-7025810, Office Action, dated Oct. 14, 2020.
(Continued)

*Primary Examiner* — Behrang Badii
*Assistant Examiner* — Jay Khandpur
(74) *Attorney, Agent, or Firm* — Moore & Van Allen PLLC; W. Kevin Ransom

(57) ABSTRACT

Method, control unit, and target arrangement of a leading vehicle for triggering a follower vehicle, which is situated at a lateral distance from the leading vehicle, to coordinate its movements with the leading vehicle. The target arrangement comprises a target configured to be placed at a lateral distance from to the leading vehicle. The target is also configured to be recognized by at least one forwardly directed sensor of the follower vehicle.

20 Claims, 6 Drawing Sheets

(56) References Cited

U.S. PATENT DOCUMENTS

| | | | |
|---|---|---|---|
| 9,675,008 B1 | 6/2017 | Rusciolelli et al. | |
| 2008/0238722 A1* | 10/2008 | Gotzig | G01S 7/521 340/932.2 |
| 2009/0099775 A1* | 4/2009 | Mott | A01D 41/127 701/300 |
| 2010/0256835 A1 | 10/2010 | Mudalige | |
| 2012/0193154 A1 | 8/2012 | Wellborn et al. | |
| 2012/0215394 A1 | 8/2012 | Wang et al. | |
| 2012/0263560 A1 | 10/2012 | Diekhans et al. | |
| 2012/0302299 A1 | 11/2012 | Behnke et al. | |
| 2013/0197758 A1* | 8/2013 | Ueda | G05D 1/0088 701/41 |
| 2013/0238166 A1 | 9/2013 | Breu et al. | |
| 2015/0203023 A1 | 7/2015 | Marti et al. | |
| 2016/0059962 A1* | 3/2016 | Abuelsaad | G08G 1/166 701/3 |
| 2016/0313740 A1 | 10/2016 | Deutscher et al. | |
| 2017/0147005 A1* | 5/2017 | Ramm | G05D 1/0295 |
| 2017/0327118 A1* | 11/2017 | Masui | B60W 50/0097 |

FOREIGN PATENT DOCUMENTS

| | | | |
|---|---|---|---|
| CN | 105205805 A | | 12/2015 |
| DE | 102008008665 B3 | | 9/2009 |
| DE | 102013010141 B3 | | 7/2014 |
| EP | 2881926 A1 | | 6/2015 |
| EP | 2896937 A1 | | 7/2015 |
| GB | 201609738 | | 7/2016 |
| GB | 2540039 A | | 1/2017 |
| JP | 2016031649 A | | 3/2016 |
| WO | 2016012867 A2 | | 1/2016 |

OTHER PUBLICATIONS

SCANIA CV AB, European Application No. 18767304.1, Extended European Search Report, dated Nov. 26, 2020.
SCANIA CV AB, International Application No. PCT/SE2018/050216, International Preliminary Report on Patentability, dated May 31, 2019.
SCANIA CV AB, International Application No. PCT/SE2018/050216, International Search Report, dated May 15, 2018.
SCANIA CV AB, International Application No. PCT/SE2018/050216, Written Opinion, dated May 15, 2018.
SCANIA CV AB, Swedish Application No. 1750288-1, Office Action, dated Oct. 13, 2017.
SCANIA CV AB, Swedish Application No. 1750288-1, Office Action, dated Feb. 20, 2019.
SCANIA CV AB, European Patent Application No. 18767304.1, New European Search Report, dated Jun. 4, 2021.
SCANIA CV AB, Chinese Patent Application No. 201880012735.2, First Office Action, dated Nov. 10, 2021.
SCANIA CV AB, Chinese Patent Application No. 201880012735.2, Second Office Action, dated Jun. 6, 2022.
SCANIA CV AB, Brazilian Patent Application No. BR112019015869-3, Preliminary Office Action, dated Sep. 20, 2022.

* cited by examiner

TARGET ARRANGEMENT, METHOD, AND CONTROL UNIT FOR FOLLOWING A TARGET VEHICLE

CROSS-REFERENCE TO RELATED APPLICATION(S)

This application is a national stage application (filed under 35 § U.S.C. 371) of PCT/SE2018/050216, filed Mar. 7, 2018 of the same title, which, in turn, claims priority to Swedish Application No. 1750288-1 filed Mar. 14, 2017; the contents of each of which are hereby incorporated by reference.

FIELD OF THE INVENTION

This document discloses a target arrangement, a control unit and a method. More particularly, a method, a control unit, and a target arrangement are provided, for triggering a follower vehicle, which is situated at a lateral distance from the leading vehicle, to coordinate its movements with the leading vehicle.

BACKGROUND OF THE INVENTION

Currently, there is no standard equipment neither for autonomous vehicles, for passenger cars, nor for heavy vehicles. Different manufacturers have deployed solutions with different sensors configurations, using primarily cameras, lidars and radars. Most of the sensors are typically placed in the front of the vehicle, to ensure better perception in the typical driving direction, i.e. for following another vehicle from behind and/or for perceiving the traffic environment in front of the vehicle.

Current sensor configurations focus on accurate sensing on the front of the vehicle, whether the vehicle is autonomous or not, where the bulk of the hardware is deployed. Side and back sensors are mostly designed to detect incoming traffic, overtaking vehicles and/or for parking the vehicle.

This approach is very reasonable under the assumption that the vehicle will drive forward and independently most of the time, but it does not solve other situations. It is sometimes desired that an autonomous vehicle follows another, laterally displaced vehicle (which may be manned or autonomous) while driving. For example, the autonomous vehicle may need to be loaded while in motion, by another laterally displaced vehicle, that also is moving. Here, the controlled vehicle will need to adapt its position to the position of the loader, and to match its velocity accordingly.

However, there is typically little hardware support in form of sensors etc., on the vehicles to facilitate such adaption of position/velocity to the other, laterally displaced vehicle during transportation.

Document DE102013010141 discloses a first vehicle with a foldable target object, which may be detected by a forwardly directed sensor situated at the front of a second vehicle. The purpose of the disclosed arrangement is test driving of a driver assistance system.

The solution disclosed in the document is not addressing the above stated problem of enabling an autonomous vehicle to follow position/velocity of another vehicle, which is laterally displaced.

Document US2012302299 discloses a drivable collecting container having sensors directed forwardly and side-ways in order to adjust velocity and position when being loaded by another vehicle, a harvesting machine, driving beside the first vehicle. The navigation system enables that both the harvesting machine and driveable collecting container are held in a constant position relative to one another while the crop is being conveyed. The solution is preferably based on GPS signals and radio systems, by way of which a so-called "electronic tow bar" can be produced. The document briefly mention that sensors may be used when GPS or radio transmission is disrupted.

However, there seems to be no possibility to alter the lateral distance between the vehicles. Instead, the lateral distance between the vehicles is predetermined and fixed.

Document US2012263560 discloses a system for controlling crop transfer from a self-propelled agricultural harvesting machine into the loading container of a hauling vehicle. The loading container may be instructed to adjust its lateral position in relation to the harvesting machine by a signal from a control unit, which is external to the involved vehicles.

However, it would be desired for a driver situated in the harvesting machine, to adjust the position of the hauling vehicle.

Document US2012193154 presents a semi-autonomous vehicle configured to follow another vehicle, based on sensor detections. However, there is no mentioning of how to enable the semi-autonomous vehicle to drive in parallel with the other vehicle, laterally displaced, as may be desired.

It appears that further development is required for reaching practical implementation of lateral displacement of an autonomous vehicle following another vehicle.

SUMMARY OF THE INVENTION

It is therefore an object of this invention to solve at least some of the above problems and improve driving in a group of laterally displaced, coordinated vehicles.

According to a first aspect of the invention, this objective is achieved by a target arrangement of a leading vehicle. The target arrangement aims at triggering a follower vehicle, which is situated at a lateral distance from the leading vehicle, to coordinate its movements with the leading vehicle. The target arrangement comprises a target, configured to be placed at a lateral distance from the leading vehicle. The target is also configured to be recognized by at least one forwardly directed sensor of the follower vehicle.

According to a second aspect of the invention, this objective is achieved by a method in a control unit. The method aims at triggering a follower vehicle to coordinate its movements with a leading vehicle comprising a target arrangement according to the first aspect. The leading vehicle is placed at a lateral distance from the follower vehicle. The method comprises detecting at least one target of the target arrangement, presented by the leading vehicle, with at least one forwardly directed sensor of the follower vehicle. Further, the method also comprises triggering the follower vehicle to follow the detected target, upon detection thereof. The method furthermore comprises obtaining information, comprising a lateral distance between the detected target and the sensor of the follower vehicle, for the follower vehicle to keep. Additionally, the method also comprises adjusting the position of the follower vehicle laterally, in relation to the detected target, according to the obtained information.

According to a third aspect of the invention, this objective is achieved by a control unit. The control unit is configured to trigger a follower vehicle to coordinate its movements with a leading vehicle comprising a target arrangement according to the first aspect. The leading vehicle is situated at a lateral distance from the follower vehicle. The control unit is configured to detect at least one target of the target arrangement, presented by the leading vehicle, when receiving a sensor signal from at least one forwardly directed sensor of the follower vehicle. Further, the control unit is configured to trigger the follower vehicle to follow the detected target, upon detection thereof. The control unit is in addition configured to obtain information, comprising a lateral distance between the detected target and the sensor, for the follower vehicle to keep. Also, the control unit is further configured to generate a command signal to adjust the position of the follower vehicle laterally, in relation to the detected target, according to the obtained information.

Thanks to the described aspects, by presenting a target in front of the follower vehicle, it becomes possible to utilize the forwardly directed sensors of the follower vehicle, which are already existing on the follower vehicle for other purposes than detecting the target, such as detecting obstacles in the way of the follower vehicle, road marks, an ahead vehicle, etc., when following a laterally displaced leading vehicle. It is thereby avoided that additional lateral sensors are added to the follower vehicle, which keeps down involved costs. Further, sensors in rough environments such as mines, agricultural environment etc., frequently must be exchanged due to dust, dirt, mechanical damage etc., while a forwardly directed sensor kept behind a windscreen is better protected and thus less prone to errors/malfunction/frequent exchange.

Thereby, it is assured that a group of coordinated, laterally displaced vehicles can perform a common work task in a safe and reliable manner, thus improving group driving.

Other advantages and additional novel features will become apparent from the subsequent detailed description.

BRIEF DESCRIPTION OF THE DRAWINGS

Embodiments of the invention will now be described in further detail with reference to the accompanying figures, in which.

DETAILED DESCRIPTION OF THE INVENTION

Embodiments of the invention described herein are defined as a target arrangement, a control unit and a method in a control unit, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
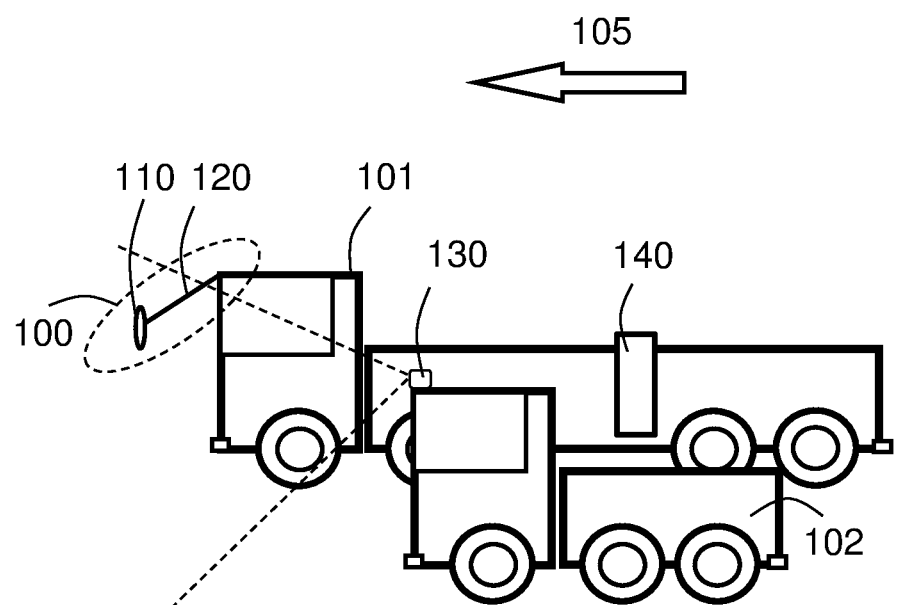
FIG. 1A illustrates an embodiment of a group of coordinated vehicles according to a side view.

FIG. 1A illustrates a scenario wherein a number of vehicles 101, 102, i.e. a leading vehicle 101 and a follower vehicle 102, driving in a common driving direction 105, with an inter-vehicular lateral distance. The vehicles 101, 102 are coordinated and organized in a group of coordinated vehicles, which may comprise more than two vehicles 101, 102 in some embodiments.

The vehicle group may be described as a chain of coordinated, inter-communicating vehicles 101, 102 travelling at given inter-vehicular distances and velocity. The inter-vehicular distances may be the same between all vehicles 101, 102 in some embodiments where more than two vehicles are comprised. In other embodiments, the inter-vehicular distances may be different for different vehicles 101, 102. Further, the lateral inter-vehicular distances may be fixed or variable in different embodiments. Thus, the lateral distances may be e.g. some centimetres, some decimetres, some meters or some tenths of meters in various embodiments.

The leading vehicle 101 and the follower vehicle 102 may cooperate in performing an operation, such as mining/collecting salt/ore, harvesting/collecting crops and similar. Alternatively, the vehicles 101, 102 may comprise a snow-plough, a grader, a roller, a blower, a de-icing distribution device, a cleaning device, or similar for clearing an airfield or other sensitive area such as a helipad, a heliport, a parking lot, a road, a spaceport, a cosmodrome and/or a drone base, etc., from snow, ice, sand/dust; or for performing cleaning, grass cutting, leaf blowing, vacuuming, material gathering or similar clearing.

The leading vehicle 101 and the follower vehicle 102 may comprise vehicles of the same, or different types in different embodiments. Any, some or all of the vehicles 101, 102 may be driver controlled or driverless autonomously controlled vehicles in different embodiments. However, in some embodiments, the leading vehicle 101 may be driven by a driver while the follower vehicle 102 is autonomous.

The follower vehicle 102 typically has one or several forwardly directed sensors, in order to perform the autonomous driving. However, the follower vehicle 102 may not have sensors on the side of the follower vehicle 102.

Instead of instrumenting the follower vehicle 102 with additional sensors for lateral environment recognition, the leading vehicle 101 is provided with a target arrangement 100 comprising a target 110 and a target supporting portion 120. The follower vehicle 102 may then detect the target 110 by a forwardly directed sensor 130. By using the already existing forwardly directed sensor 130 on the follower vehicle 102 for detecting the controllable target 110 of the leading vehicle 101, it could be avoided to add laterally directed sensors, or advanced laterally directed sensors. The physical target 110 and the target supporting portion are cheap and easy to implement.

The target 110 may be placed in front of the follower vehicle 102, to be perfectly perceivable by its existing sensors 130. Wireless vehicle-to-vehicle communication can then be used by the leading vehicle 101, in some alternative embodiments, to instruct the follower vehicle 102 of the (lateral/longitudinal) distance and/or speed it should keep from the target 110.

In the illustrated embodiment, the leading vehicle 110 is a loading vehicle comprising a loading belt 140, loading harvested salt into a bucket of the follower vehicle 102.

Figure 1B:
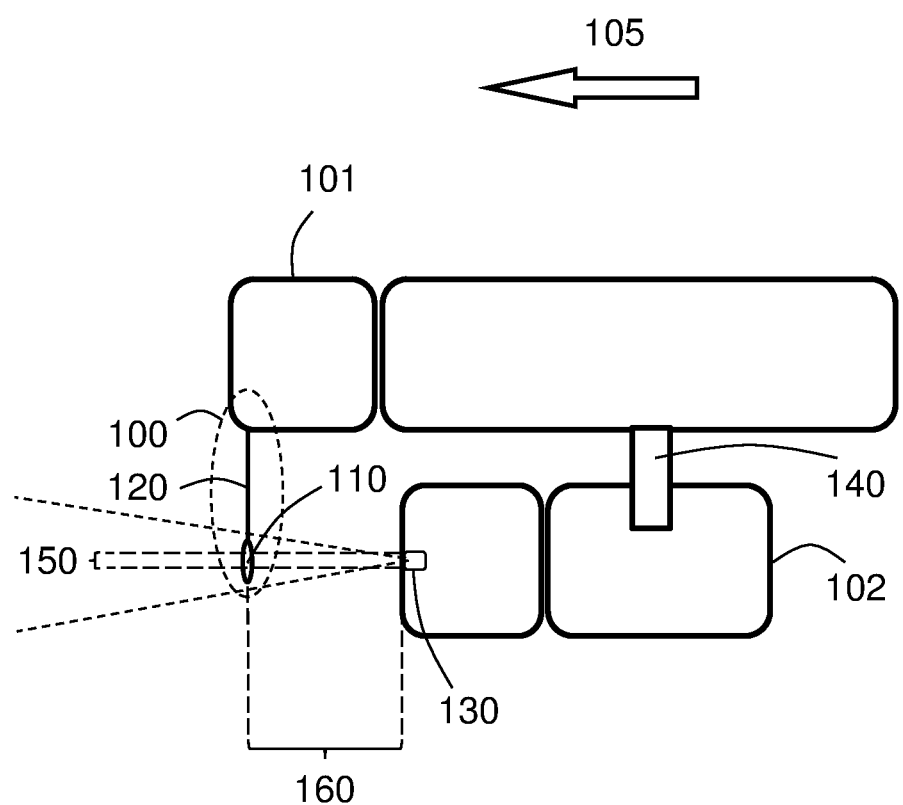
FIG. 1B illustrates an embodiment of a group of coordinated vehicles according to a top view.

FIG. 1B depicts a top view of the vehicles 101, 102 previously illustrated embodiment in FIG. 1A. The sensor 130 may detect the target 110 and possibly also detect information provided on the target concerning a lateral distance 150 between the target 110 and the sensor 130 of the follower vehicle 102, for the follower vehicle 102 to keep; and/or a longitudinal distance 160 between the target 110 and the sensor 130, for the follower vehicle 102 to keep; and/or vehicle path alignment information for the follower vehicle 102 to keep; and/or a speed for the follower vehicle 102 to keep.

In the illustrated embodiment, which is merely an arbitrary example, the forwardly directed sensor 130 may be situated e.g. at the front of the follower vehicle 102, e.g. behind a windscreen, on a roof or in a front part of the follower vehicle 102.

Mounting the forwardly directed sensor 130 behind the windscreen has some advantages compared to externally mounted sensors 130. These advantages include the possibility to use windscreen wipers for cleaning and using the light from headlights to illuminate objects in the sensor's 130 field of view. It is also protected from dirt, snow, rain and to some extent also from damage, vandalism and/or theft. Such sensor 130 may also be used for a variety of other tasks.

The sensor 130 may be directed towards the front of the vehicle 100, in the driving direction 105. The sensor 130 may comprise e.g. a camera, a stereo camera, an infrared camera, a video camera, a radar, a lidar, an ultrasound device, a time-of-flight camera, or similar device, in different embodiments. In some embodiments, the follower vehicle 102 may comprise a plurality of sensors 130 which may be of the same, or different kinds, such as e.g. a radar and a camera; a lidar and a radar, etc.

The target 110 may in some embodiments comprise information concerning the lateral distance 150, or displacement interval, between the target 110 and the sensor 130 of the follower vehicle 102, for the follower vehicle 102 to keep; and/or a longitudinal distance 160 between the target 110 and the sensor 130 of the follower vehicle 102; vehicle path alignment information for the follower vehicle 102 to keep; and/or a speed for the follower vehicle 102 to keep. This information may e.g. be written with digits/letters on the target 110 and recognized by a sensor 130 in form of a camera in combination with computer vision.

Computer vision is a technical field comprising methods for acquiring, processing, analysing, and understanding images and, in general, high-dimensional data from the real world in order to produce numerical or symbolic information. A theme in the development of this field has been to duplicate the abilities of human vision by electronically perceiving and understanding an image. Understanding in this context means the transformation of visual images (the input of retina) into descriptions of world that can interface with other thought processes and elicit appropriate action. This image understanding may be regarded as the disentangling of symbolic information from image data using models constructed with the aid of geometry, physics, statistics, and learning theory. Computer vision may also be described as the enterprise of automating and integrating a wide range of processes and representations for vision perception.

Figure 1C:
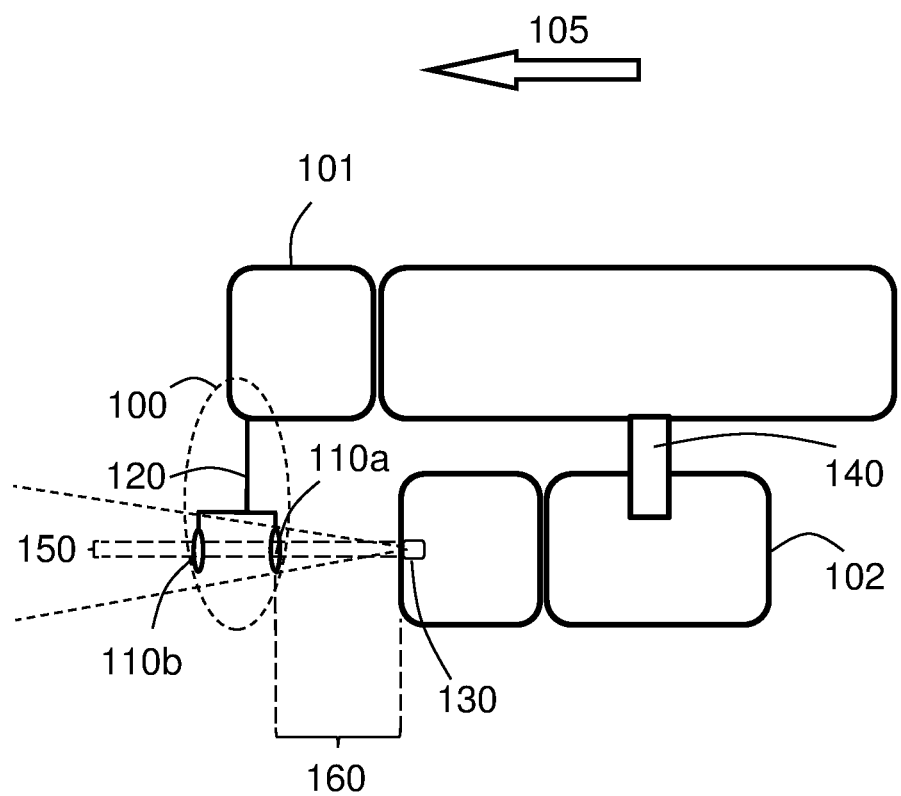
FIG. 1C illustrates an embodiment of a group of coordinated vehicles according to a top view.
Figure 1D:
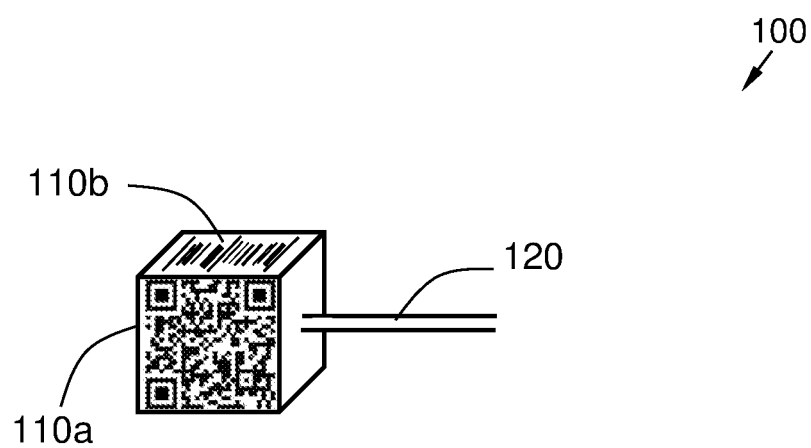
FIG. 1D illustrates a target according to an embodiment.

In other embodiments, the information may e.g. be provided by providing a QR (Quick Response) code, bar code, etc., on the target 110, as illustrated in FIG. 1D. Further, the target 110 may be provided with some other specific encoding of a value, which is commonly known by both the leading vehicle 101 and the follower vehicle 102, e.g. red color may have the encoded meaning: keep 8 meters longitudinal distance; green color may have the encoded meaning: keep 6 meters longitudinal distance, etc.

The target 110 of the target arrangement 100 may also comprise a plurality of target portions 110a, 110b, each associated with a respective longitudinal distance 160 to keep between the target 110 and the sensor 130 of the follower vehicle 102, wherein the target portion 110a, 110b to be presented is selectable from the leading vehicle 101. Thereby, the driver of the leading vehicle 101 may adjust the longitudinal distance 160 from filling up a first bucket of the follower vehicle 102, to filling up a second bucket of the follower vehicle 102, in case the follower vehicle 102 has a plurality of buckets longitudinally arranged on the follower vehicle 102.

The target 110 may in some embodiments comprise a display for outputting information. Different target portions 110a, 110b may be different displayed pages of information, in some embodiments. The displayed information may be outputted as letters/digits; as QR codes, as bar codes; as other codes, etc.

In some embodiments, wherein the sensor 130 comprises a radar, the target 110 may be designed for being as easy as possible for the radar sensor 130 to detect.

The above-mentioned information, or other information for coordinating the movements of the vehicles 101, 102 may be provided by a wireless signal, in some embodiments.

Such wireless signal may comprise, or at least be inspired by wireless communication technology such as Wi-Fi, Wireless Local Area Network (WLAN), Ultra Mobile Broadband (UMB), Bluetooth (BT), Near Field Communication (NFC), Radio-Frequency Identification (RFID), optical communication such as Infrared Data Association (IrDA) or infrared transmission to name but a few possible examples of wireless communications in some embodiments.

In some embodiments, the communication between vehicles 101, 102 in the group may be performed via vehicle-to-vehicle (V2V) communication, e.g. based on Dedicated Short-Range Communications (DSRC) devices. DSRC works in 5.9 GHz band with bandwidth of 75 MHz and approximate range of 1000 m in some embodiments.

The wireless communication may be made according to any IEEE standard for wireless vehicular communication like e.g. a special mode of operation of IEEE 802.11 for vehicular networks called Wireless Access in Vehicular Environments (WAVE). IEEE 802.11p is an extension to 802.11 Wireless LAN medium access layer (MAC) and physical layer (PHY) specification.

In some embodiments, when the vehicles 101, 102 are coordinated and are communicating, the driver of the leading vehicle 101 drive the own vehicle 101 and the other vehicles 102 in the group are merely following the driving commands of the leading vehicle 101.

The lateral and/or longitudinal distances 150, 160 between the coordinated vehicles 101, 102 are kept within a respective distance interval. It is thereby assured that the vehicles 101, 102 keep and maintain minimum distances to avoid any accidents while at the same time keep the maximum distance for avoiding that the cooperation between the vehicles 101, 102 becomes impossible to perform.

FIG. 1C depicts a top view of the vehicles 101, 102 previously illustrated embodiment in FIG. 1A. In the illustrated embodiment, the target 110 of the target arrangement 100 comprises a plurality of target portions 110*a*, 110*b*, which are to be aligned with the sensor 130 in the follower vehicle 102.

The follower vehicle 102, as well as the leading vehicle 101 typically has at least one wheel axle which is steerable. Thus, the front part of the follower vehicle 102, or the sensor 130 of the follower vehicle 102 may be at the required longitudinal distance 160, and also within the lateral distance 150, while the rear end, i.e. the bucket of the follower vehicle 102 is angled away from the leading vehicle 101, resulting in a possibly less than optimal cooperation between he vehicles 101, 102.

For this reason, to align the respective paths of the vehicles 101, 102, the sensor may align the plurality of target portions 110*a*, 110*b* to form a leading line, much in the same way as maritime navigation in narrow waters, e.g. in the archipelago is made; i.e. when the sensor 130 perceive the first target portion 110*a* and the second target portion 110*b* without lateral displacement.

Figure 2:
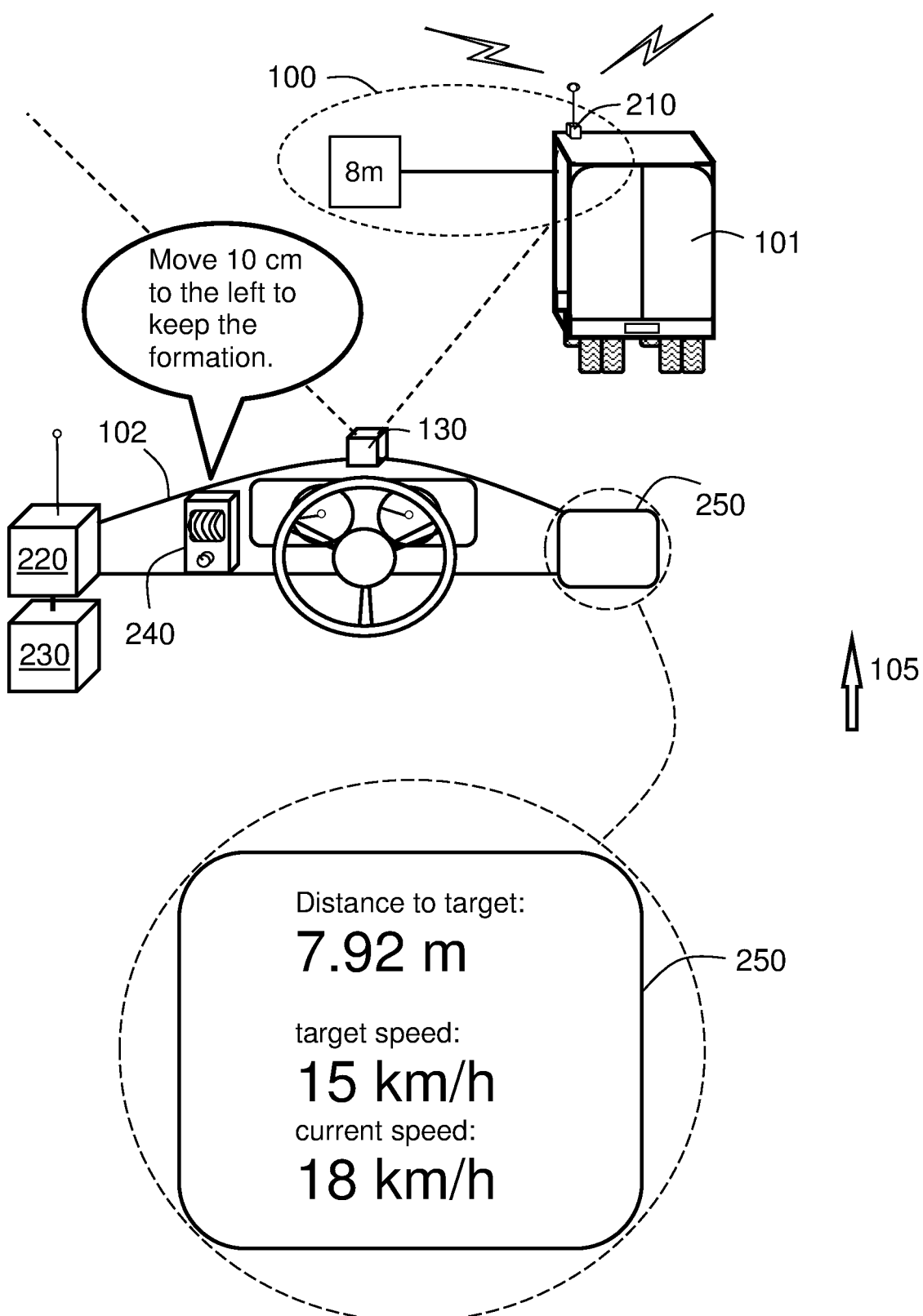
FIG. 2 illustrates a vehicle interior according to an embodiment.

FIG. 2 illustrates an example of a scenario as previously illustrated in FIG. 1A and FIG. 1B, as it may be perceived by a hypothetical driver of the follower vehicle 102, keeping in mind that the follower vehicle 102 may be an autonomous vehicle without a driver.

The leading vehicle 101 may comprise a wireless communication device 210, configured to provide various information related to the inter-vehicular cooperation between the vehicles 101, 102. This information may for example comprise a lateral distance 150 between the target 110 and the sensor 130 of the follower vehicle 102, to keep by the follower vehicle 102; a longitudinal distance 160 for the follower vehicle 102 to keep between the target 110 and the sensor 130 of the follower vehicle 102, and/or a speed for the follower vehicle 102 to keep during the cooperation.

In the illustrated embodiment, some information, in this case the longitudinal target distance 160, may be provided via the target 110 while some information may be provided via wireless communication provided by the wireless communication device 210 of the leading vehicle 101, via any of the previously enumerated wireless communication technologies. The information may then be received by a wireless receiver 220 in the follower vehicle 102.

The received wireless signals may be provided to a control unit 230 of the follower vehicle 102, which may interpret the received signals into information, and also apply this received information, e.g. by outputting the information via an output unit 240, 250 of the follower vehicle 102.

The output unit 240, 250 may comprise a display, a loudspeaker, a projector, a head-up display, a display integrated in the windshield of the vehicle 102, a display integrated in the dashboard of the vehicle 102, a tactile device, a portable device of the vehicle driver/owner, intelligent glasses, i.e. an optical head-mounted display, that is designed in the shape of a pair of eyeglasses of the vehicle driver/owner, etc., an augmented reality device, an intelligent watch, etc.; or a combination thereof.

In this illustrated non-limiting embodiment, an instruction to adjust the lateral position of the follower vehicle 102 is provided via a loudspeaker 240, while current distance to the target 110, the target speed and the current speed of the follower vehicle 102 is provided on a display 250.

The various entities on-board the follower vehicle 102 may communicate with each other via e.g. a wired or wireless communication bus. The communication bus may comprise e.g. a Controller Area Network (CAN) bus, a Media Oriented Systems Transport (MOST) bus, or similar. However, the communication may alternatively be made over a wireless connection comprising, or at least be inspired by any of the previously discussed wireless communication technologies.

Figure 3A:
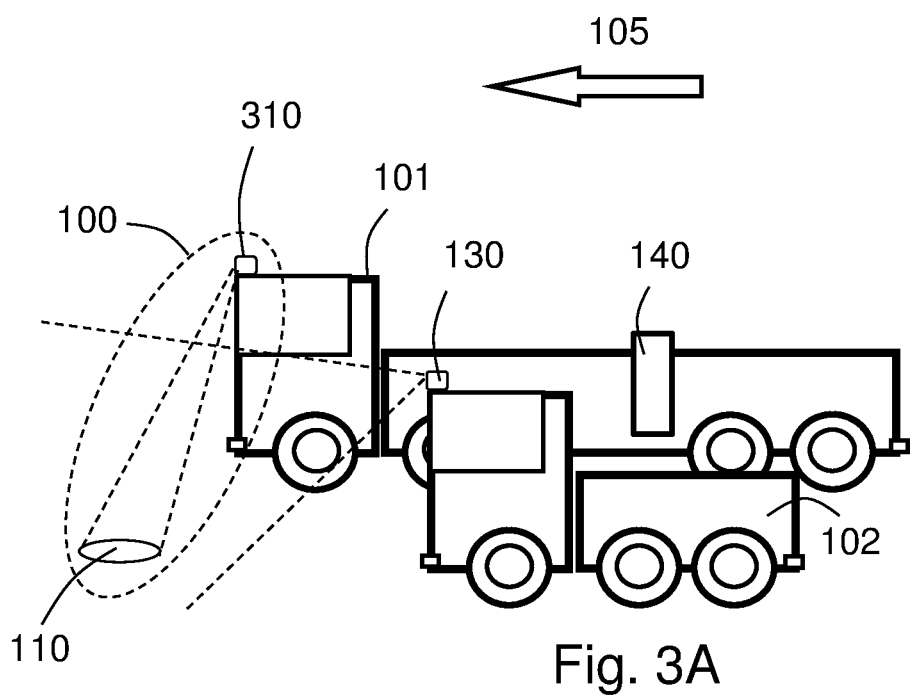
FIG. 3A illustrates an embodiment of a group of coordinated vehicles according to a side view.

FIG. 3A illustrates a scenario similar to the scenario already illustrated in FIG. 1A, but wherein the target arrangement 100 in the leading vehicle 101 comprises an electromagnetic radiation source 310, or projector as it also may be referred to as. The target 110 is laterally displaced in relation to the leading vehicle 101 by projection of electromagnetic radiation, outputted by the electromagnetic radiation source 310.

The electromagnetic radiation may comprise e.g. visible light, infrared light, ultraviolet light, etc. The electromagnetic radiation source 310 may comprise a laser in some embodiments; or a bulb/diode configured for emitting electromagnetic radiation in form of e.g. visible light, infrared light, ultraviolet light, etc.

An advantage with using visible light for illustrating the target 110 is that it is easy for a human driver in the follower vehicle 102 to detect. An advantage with using non-visible light such as infrared light, and/or ultraviolet light is that human drivers or other road users are not disturbed/distracted by the projected target 110.

An advantage with using projection instead of a physical target as utilized in the embodiment of FIG. 1A is that the risk of that the physical target involuntarily hits an object/obstacle in the environment is omitted. Further, the usage of projection instead of the physical target is that there is no problem to coordinate the vehicles 101, 102, also when the follower vehicle 102 is driving ahead of the leading vehicle 101.

Figure 3B:
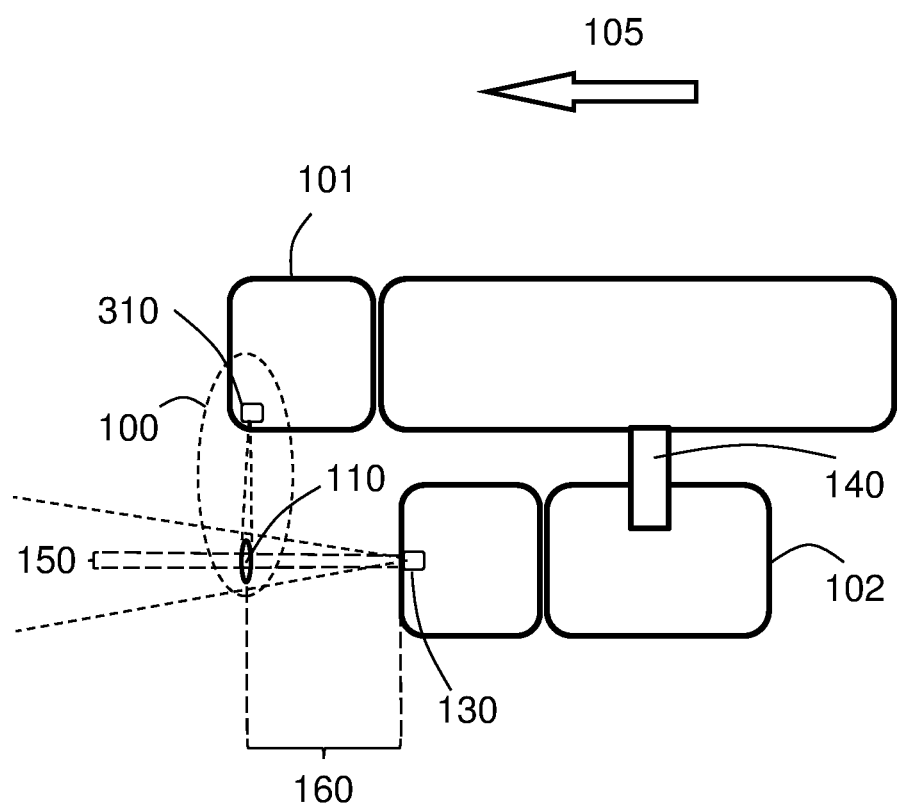
FIG. 3B illustrates an embodiment of a group of coordinated vehicles according to a top view.

FIG. 3B illustrates a scenario similar to the scenario already illustrated in FIG. 1B, but wherein the target arrangement 100 in the leading vehicle 101 comprises an electromagnetic radiation source 310.

Figure 3C:
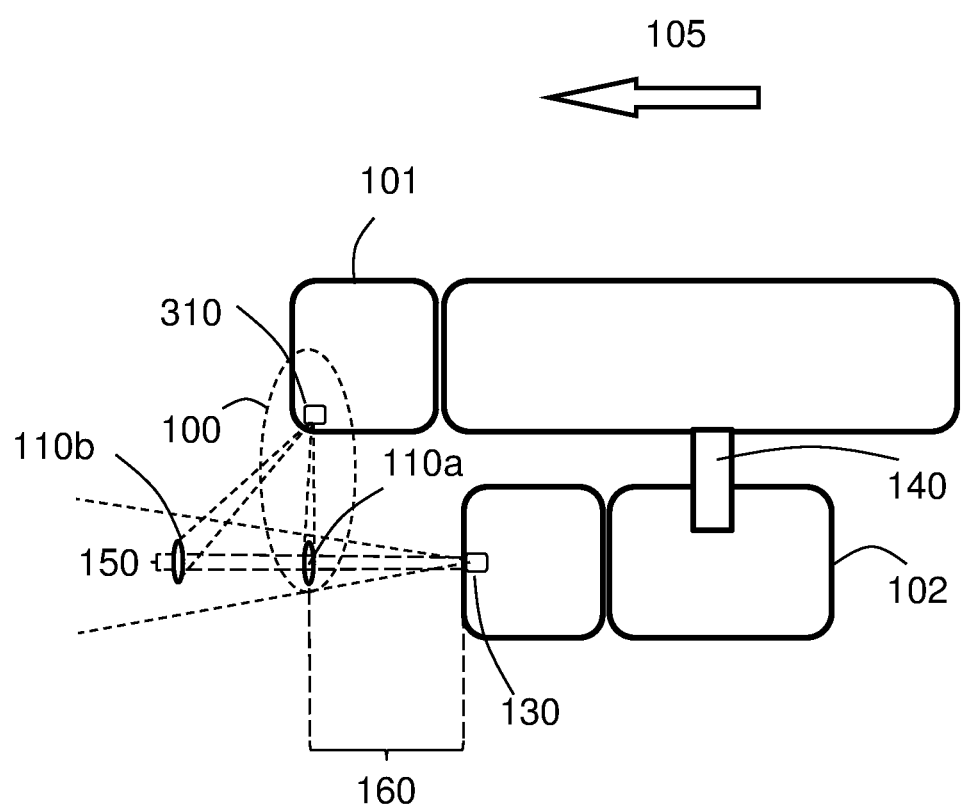
FIG. 3C illustrates an embodiment of a group of coordinated vehicles according to a top view.

FIG. 3C illustrates a scenario similar to the scenario already illustrated in FIG. 1C, but wherein the target arrangement 100 in the leading vehicle 101 comprises an electromagnetic radiation source 310, configured to project a plurality of target portions 110*a*, 110*b*, which are to be aligned with the sensor 130 in the follower vehicle 102.

Figure 4:
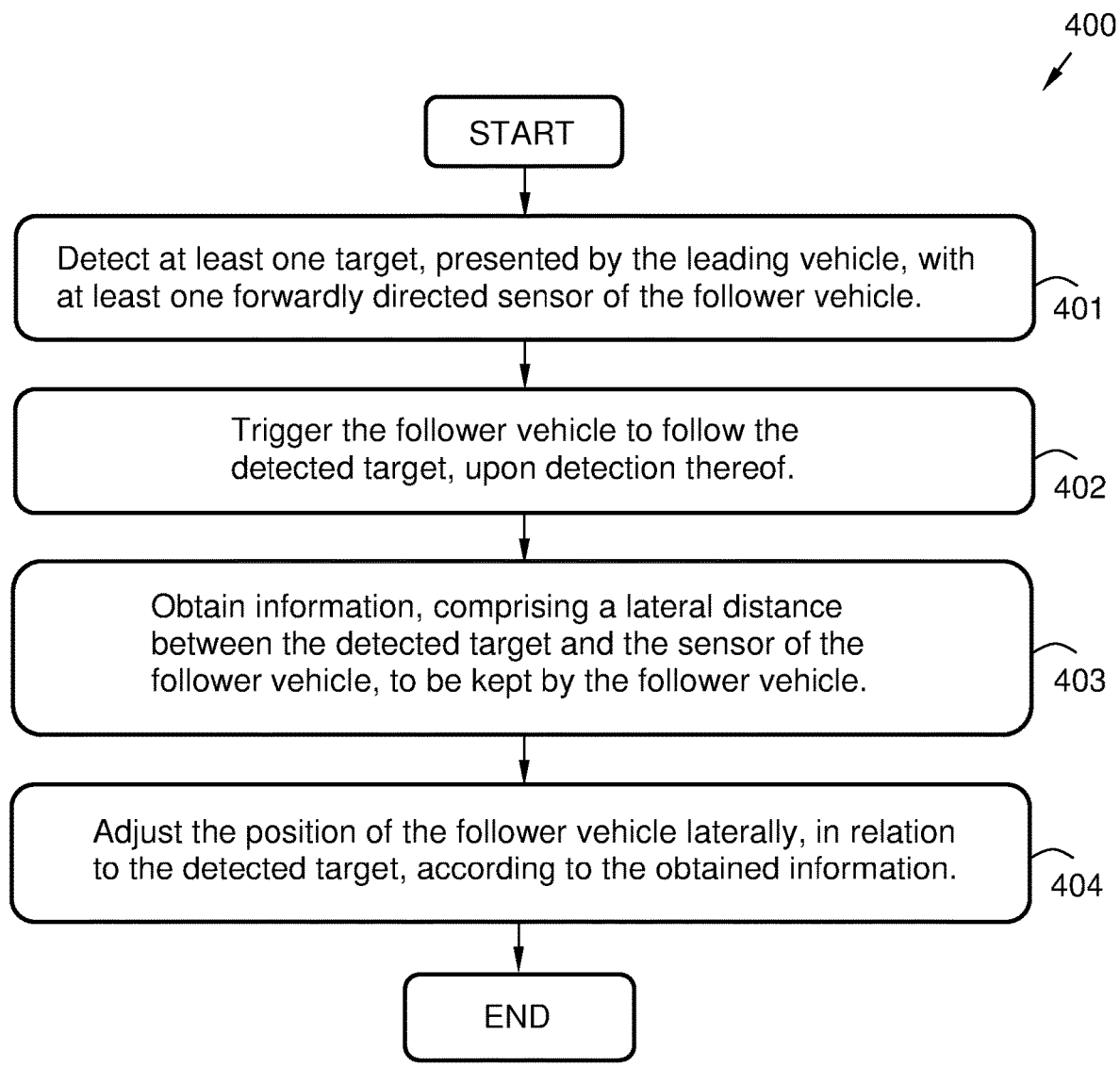
FIG. 4 is a flow chart illustrating an embodiment of the method.

FIG. 4 illustrates an example of a method 400 according to an embodiment. The flow chart in FIG. 4 shows the method 400 in a control unit 230. The control unit 230 may be situated in a follower vehicle 102, comprised in a group of coordinated vehicles 101, 102 in a formation for performing a task. In other alternative embodiments, the control unit 230 may be situated in a vehicle external structure, or in the leader vehicle 101.

The method 400 aims at triggering a follower vehicle 102 to coordinate its movements with a leading vehicle 101 comprising a target arrangement 100, wherein the leading vehicle 101 is situated at a lateral distance in relation to the follower vehicle 102.

The vehicles 101, 102 in the coordinated group may be any arbitrary kind of means for conveyance which are driving at a lateral distance in relation to each other.

In order to correctly be able to trigger the follower vehicle 102 to coordinate its movements with the leading vehicle 101, the method 400 may comprise a number of steps 401-404. Further, the described steps 401-404 may be performed in a somewhat different chronological order than the numbering suggests. The method 400 may comprise the subsequent steps:

Step 401 comprises detecting at least one target 110 of the target arrangement 100, presented by the leading vehicle 101, with at least one forwardly 105 directed sensor 130 of the follower vehicle 102.

The follower vehicle 102 may be configured to detect the target 110 by a plurality of forwardly 105 directed sensors 130.

Step 402 comprises triggering the follower vehicle 102 to follow the detected 401 target 110, upon detection 401 thereof.

The triggering may comprise that the control unit 230 generates and provide control commands to a steering unit and an actuator unit of the follower vehicle 102, in order to follow the detected 401 target 110. An advantage by presenting the target 110 for the follower vehicle 102 and associating the target 110 with an instruction to follow the target 110 is that problems associated with autonomous vehicles following another, "wrong" vehicle. The detection of the target 110 may thus trigger a following action by the follower vehicle 102.

Step 403 comprises obtaining information, comprising a lateral distance 150, or lateral displacement interval, between the detected 401 target 110 and the sensor 130 of the follower vehicle 102, for the follower vehicle 102 to keep.

The obtained information may further comprise a longitudinal distance 160, or longitudinal displacement interval to keep between the detected 401 target 110 and the sensor 130 of the follower vehicle 102, and/or a speed for the follower vehicle 102 to keep.

The obtained information may further comprise vehicle path alignment information in some embodiments.

The information may in some embodiments be obtained by interpreting information provided by the detected 401 target 110.

The information may be obtained via a wireless communication interface, from a wireless communication device 210 of the leading vehicle 101, in some embodiments.

The information may in some alternative embodiments comprise e.g. a maximum allowed velocity, a maximum allowed acceleration and/or a maximum allowed retardation of the follower vehicle 102 in the group.

Step 404 comprises adjusting the position of the follower vehicle 102 laterally, in relation to the detected 401 target 110, according to the obtained 403 information.

The adjustment of position may comprise adjusting the longitudinal distance 160 between the detected 401 target 110 and the sensor 130 of the follower vehicle 102, according to the obtained 403 information.

The adjustment of the position of the follower vehicle 102 may be made for aligning the respective driving paths of the leading vehicle 101 and the follower vehicle 102, in the driving direction 105.

Further, in some embodiments, the adjustment may comprise adjustment of speed of the follower vehicle 102.

The control unit 230 may be comprised in the follower vehicle 102, in the leading vehicle 101, or at a vehicle external structure in different embodiments. The control unit 230 may be configured for performing the described method 400 according to at least some of the method steps 401-404. The control unit 230 may be configured to detect at least one target 110 of the target arrangement 100, presented by the leading vehicle 101, when receiving a sensor signal from at least one forwardly 105 directed sensor 130 of the follower vehicle 102. Further, the control unit 230 may also be configured to trigger the follower vehicle 102 to follow the detected target 110, upon detection thereof. In further addition, the control unit 230 may also be configured to obtain information, comprising a lateral distance 150 between the detected target 110 and the sensor 130, for the follower vehicle 102 to keep. Also, the control unit 230 may be configured to generate a command signal to adjust the position of the follower vehicle 102 laterally, in relation to the detected target 102, according to the obtained information.

The control unit 230 may also in some embodiments wherein the obtained information further comprises a longitudinal distance 160 to keep between the detected target 110 and the sensor 130 of the follower vehicle 102, and/or a speed for the follower vehicle 102 to keep; be configured to adjust the position of the follower vehicle 102 by adjusting the longitudinal distance 160 between the detected target 110 and the sensor 130 of the follower vehicle 102, according to the obtained information.

The control unit 230 may in some embodiments wherein the obtained information further comprises vehicle path alignment information be configured to adjust the position of the follower vehicle 102 by aligning the respective driving paths of the leading vehicle 101 and the follower vehicle 102.

The control unit 230 may further be configured to obtain the information by interpreting information provided by the detected target 110, in some embodiments.

In some embodiments, the control unit 230 may be further configured to obtain the information via a wireless communication interface, from a wireless communication device 210 of the leading vehicle 101.

The control unit 230 may further comprise a processor, configured for performing various calculations and computations in order to perform the method 400, according to the previously described steps 401-404.

Such processor may comprise one or more instances of a processing circuit, i.e. a Central Processing Unit (CPU), a processing unit, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Furthermore, the control unit 230 may comprise a memory in some embodiments. The optional memory may comprise a physical device utilized to store data or programs, i.e., sequences of instructions, on a temporary or permanent basis. According to some embodiments, the memory may comprise integrated circuits comprising silicon-based transistors. The memory may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The previously described method steps 401-404 to be performed in the control unit 230 may be implemented through the one or more processors within the control unit 230, together with computer program product for performing at least some of the functions of the method steps 401-404. Thus a computer program product, comprising instructions for performing the method steps 401-404 in the control unit 230 may perform the method 400 comprising at least some of the method steps 401-404 for triggering a follower vehicle 102 to coordinate its movements with a leading vehicle 101 comprising a target arrangement 100, when the computer program is loaded into the one or more processors of the control unit 230. The described method steps 401-404 may thus be performed by a computer algorithm, a machine executable code, a non-transitory computer-readable medium, an appropriately configured hardware or a software instructions programmed into a suitable programmable logic such as the processor in the control unit 230.

The computer program product mentioned above may be provided for instance in the form of a data carrier carrying computer program code for performing at least some of the method step 401-404 according to some embodiments when being loaded into the one or more processors of the control unit 230. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 230 remotely, e.g., over an Internet or an intranet connection.

The previously described leader vehicle 101 may comprise a target arrangement 100 according to any of the previously described embodiments, illustrated in FIGS. 1A-1D and/or FIGS. 3A-3C. The previously described follower vehicle 102 may comprise a control unit 230. However, the control unit 230 may alternatively in some embodiments be comprised in the leader vehicle 101, or at a vehicle external structure.

The terminology used in the description of the embodiments as illustrated in the accompanying drawings is not intended to be limiting of the described target arrangement 100, method 400, control unit 230, computer program, leader vehicle 101, and/or follower vehicle 102. Various changes, substitutions and/or alterations may be made, without departing from invention embodiments as defined by the appended claims. Further, the herein described different embodiments, illustrated in FIGS. 1-4 may be combined and exchanged without limitations in various other embodiments, within the scope of the independent claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A target arrangement associated with a leading vehicle, where the target arrangement is used for triggering a follower vehicle situated at a lateral distance from the leading vehicle to coordinate the follower vehicle's movements with the leading vehicle, wherein the target arrangement comprises: a target that is, during use, associated with the leading vehicle and that is one of: (i) connected and extending from or (ii) projecting outwardly from the leading vehicle at a lateral, spaced-apart distance from the leading vehicle so that the target's position indicates a current position of the leading vehicle and the target can be detected by at least one forwardly directed sensor of the follower vehicle and used by the follower vehicle to coordinate its movements with that of the leading vehicle via sensing the target.

2. The target arrangement according to claim 1, wherein the target comprises information concerning:
a lateral distance between the target and the sensor of the follower vehicle for the follower vehicle to maintain;
a longitudinal distance to be maintained between the target and the sensor of the follower vehicle;
vehicle path alignment information for the follower vehicle to maintain; and/or
a speed for the follower vehicle to maintain.

3. The target arrangement according to claim 1, wherein the target comprises a plurality of target portions, which are to be aligned with the sensor in the follower vehicle.

4. The target arrangement according to claim 1, wherein the target comprises a plurality of target portions, each associated with a respective longitudinal distance to be maintained between the target and the sensor of the follower vehicle, wherein the target portion to be presented is selectable from the leading vehicle.

5. The target arrangement according to claim 1, further comprising:
a wireless communication device configured to provide information concerning:
a lateral distance between the target and the sensor of the follower vehicle to be maintained by the follower vehicle;
a longitudinal distance to be maintained between the target and the sensor of the follower vehicle to the follower vehicle; and/or
a speed for the follower vehicle to maintain.

6. The target arrangement according to claim 1, further comprising:
a target supporting portion mounted in the leading vehicle, wherein the target is placed at a lateral, spaced-apart distance from the leading vehicle by the target supporting portion.

7. The target arrangement according to claim 1, further comprising an electromagnetic radiation source situated in the leading vehicle, wherein the target is created by projecting electromagnetic radiation from the electromagnetic radiation source at a lateral, spaced-apart distance from the leading vehicle to thereby form the target.

8. A method operated in a control unit for triggering a follower vehicle to coordinate its movements with a leading vehicle, wherein the leading vehicle is situated at a lateral distance from the follower vehicle, wherein the leading vehicle comprises a target that is, during use, associated with the leading vehicle and that is one of: (i) connected and extending from or (ii) projecting outwardly from the leading vehicle at a lateral, spaced-apart distance from the leading vehicle so that the target's position indicates a current position of the leading vehicle and the target can be detected by at least one forwardly directed sensor of the follower vehicle and used by the follower vehicle to coordinate its movements with that of the leading vehicle via sensing the target, wherein the method comprises:

detecting at least one target of the target arrangement presented by the leading vehicle, with at least one forwardly directed sensor of the follower vehicle;

triggering the follower vehicle to follow the detected target, upon detection thereof;

obtaining information comprising a lateral distance between the detected target and the sensor of the follower vehicle, for the follower vehicle to maintain; and adjusting the position of the follower vehicle laterally, in relation to the detected target, according to the obtained information.

9. The method according to claim 8, wherein the obtained information further comprises:

a longitudinal distance to be maintained between the detected target and the sensor of the follower vehicle, and/or a speed for the follower vehicle to maintain, wherein the adjustment of position comprises adjusting the longitudinal distance between the detected target and the sensor of the follower vehicle according to the obtained information.

10. The method according to claim 8, wherein the obtained information further comprises vehicle path alignment information, wherein the adjustment of the position of the follower vehicle is made for aligning the respective driving paths of the leading vehicle and the follower vehicle.

11. The method according to claim 8, wherein the information is obtained by interpreting information provided by the detected target.

12. The method according to claim 8, wherein the information is obtained via a wireless communication interface from a wireless communication device of the leading vehicle.

13. A control unit for triggering a follower vehicle to coordinate its movements with a leading vehicle, wherein the leading vehicle is situated at a lateral distance from the follower vehicle, wherein the leading vehicle comprises a target arrangement having a target that is, during use, associated with the leading vehicle and that is one of: (i) connected and extending from or (ii) projecting outwardly from the leading vehicle at a lateral, space-apart distance from the leading vehicle so that the target's position indicates a current position of the leading vehicle and the target can be detected by at least one forwardly directed sensor of the follower vehicle and used by the follower vehicle to coordinate its movements with that of the leading vehicle via sensing the target, wherein the control unit is configured to:

detect at least one target of the target arrangement presented by the leading vehicle, when receiving a sensor signal from at least one forwardly directed sensor of the follower vehicle;

trigger the follower vehicle to follow the detected target, upon detection thereof;

obtain information, comprising a lateral distance between the detected target and the sensor for the follower vehicle to maintain; and generate a command signal to adjust the position of the follower vehicle laterally in relation to the detected target according to the obtained information.

14. The control unit according to claim 13, wherein the obtained information further comprises a longitudinal distance to be maintained between the detected target and the sensor of the follower vehicle, and/or a speed for the follower vehicle to maintain, wherein the control unit is further configured to adjust the position of the follower vehicle by adjusting the longitudinal distance between the detected target and the sensor of the follower vehicle according to the obtained information.

15. The control unit according to claim 13, wherein the obtained information further comprises vehicle path alignment information, and wherein the adjustment of the position of the follower vehicle is made for aligning the respective driving paths of the leading vehicle and the follower vehicle in the driving direction.

16. The control unit according to claim 13, further configured to obtain the information via a wireless communication interface from a wireless communication device of the leading vehicle.

17. A leader vehicle, comprising a target arrangement for triggering a follower vehicle situated at a lateral distance from the leading vehicle to thereby coordinate the follower vehicle's movements with the leading vehicle, wherein the target arrangement comprises:

a target that is, during use, associated with the leading vehicle and that is one of: (i) connected and extending from or (ii) projecting outwardly from the leading vehicle at a lateral, spaced-apart distance from the leading vehicle so that the target's position indicates a current position of the leading vehicle and the target can be detected by at least one forwardly directed sensor of the follower vehicle and used by the follower vehicle to coordinate its movements with that of the leading vehicle via sensing the target.

18. A follower vehicle, comprising a control unit for triggering a follower vehicle to thereby coordinate the follower vehicle's movements with a leading vehicle, wherein the leading vehicle is situated at a lateral distance from the follower vehicle, wherein the leading vehicle comprises a target arrangement comprising a target that is, during use, associated with the leading vehicle and that is one of: (i) connected and extending from or (ii) projecting outwardly from the leading vehicle at a lateral, spaced-apart distance from the leading vehicle so that the target's position indicates a current position of the leading vehicle and the target can be detected by at least one forwardly directed sensor of the follower vehicle and used by the follower vehicle to coordinate its movements with that of the leading vehicle via sensing the target, wherein the control unit is configured to:

detect at least one target of the target arrangement presented by the leading vehicle, when receiving a sensor signal from at least one forwardly directed sensor of the follower vehicle;

trigger the follower vehicle to follow the detected target, upon detection thereof;

obtain information, comprising a lateral distance between the detected target and the sensor for the follower vehicle to maintain; and generate a command signal to adjust the position of the follower vehicle laterally in relation to the detected target according to the obtained information.

19. A computer program product comprising computer program code stored on a non-transitory computer-readable medium, said computer program product used for triggering a follower vehicle to coordinate its movements with a leading vehicle, wherein the leading vehicle is situated at a lateral distance from the follower vehicle, wherein the leading vehicle comprises a target arrangement having a target that is, during use, associated with the leading vehicle and that is one of: (i) connected and extending from or (ii) projecting outwardly from the leading vehicle at a lateral, spaced-apart distance from the leading vehicle so that the target's position indicates a current position of the leading vehicle and the target can be detected by at least one forwardly directed sensor of the follower vehicle and used by the follower vehicle to coordinate its movements with that of the leading vehicle via sensing the target, said computer program code comprising computer instructions to cause one or more control units to perform the operations of:

detecting at least one target of the target arrangement presented by the leading vehicle, with at least one forwardly directed sensor of the follower vehicle;

triggering the follower vehicle to follow the detected target, upon detection thereof;

obtaining information, comprising a lateral distance between the detected target and the sensor of the follower vehicle, for the follower vehicle to maintain; and adjusting the position of the follower vehicle laterally, in relation to the detected target, according to the obtained information.

20. A target arrangement associated with a leading vehicle, where the target arrangement is used for triggering a follower vehicle situated at a lateral distance from the leading vehicle to coordinate the follower vehicle's movements with the leading vehicle, wherein the target arrangement comprises: a target that is, during use, associated with the leading vehicle and that is one of:

(i) connected to the leading vehicle by a supporting portion and extending from the leading vehicle at a lateral, spaced-apart distance from the leading vehicle by the target supporting portion; or (ii) created by projecting outwardly from the leading vehicle at a lateral, spaced-apart distance from the leading vehicle electromagnetic radiation emitted from an electromagnetic radiation source situated in the leading vehicle, so that the target's position indicates a current position of the leading vehicle, and the target can be detected by at least one forwardly directed sensor of the follower vehicle and used by the follower vehicle to coordinate its movements with that of the leading vehicle via sensing the target.

\* \* \* \* \*